Aug. 18, 1942.   R. L. OVERHOLT   2,293,558
COATING COMPOSITION
Filed Sept. 27, 1939
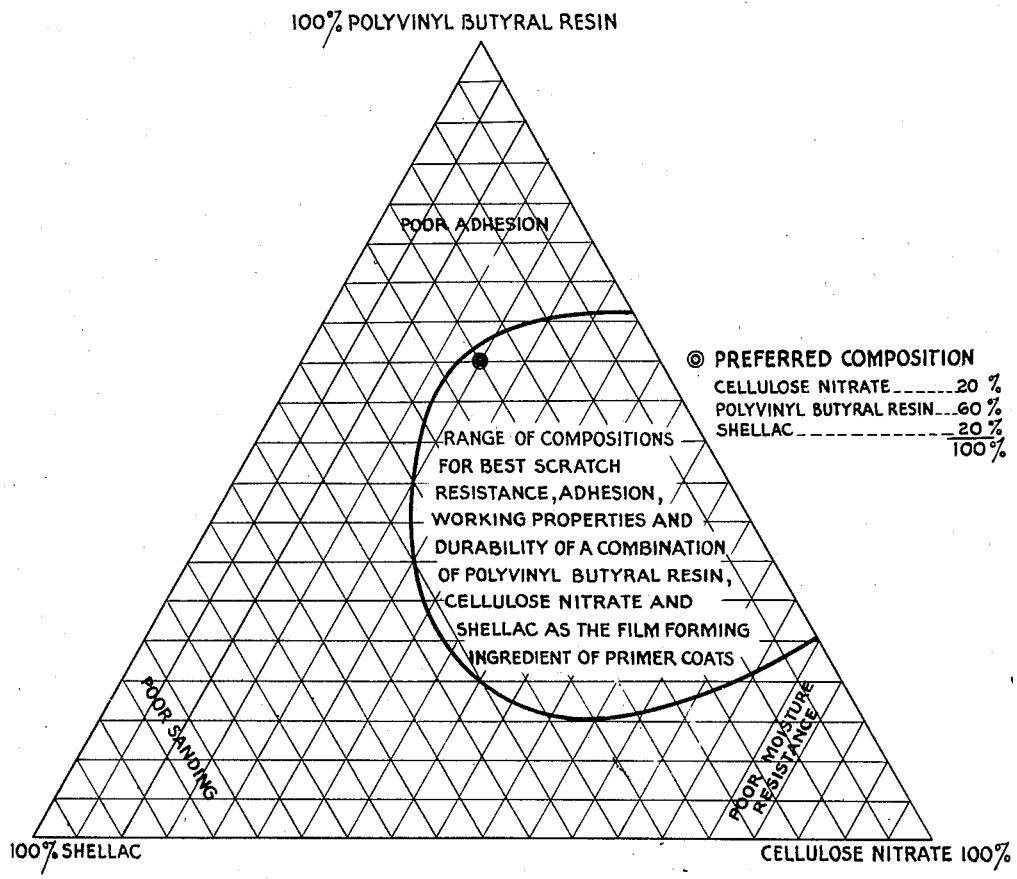
Ray L. Overholt   INVENTOR
BY Frank C. Hilberg
ATTORNEY Patented Aug. 18, 1942

2,293,558

UNITED STATES PATENT OFFICE 2,293,558

COATING COMPOSITION

Ray L. Overholt, Highland Park, N. J., assignor to E. I. du Pont de Nemours & Company, Wilmington, Del., a corporation of Delaware Application September 27, 1939, Serial No. 296,762

3 Claims. (Cl. 260—17)

This invention relates to scratch-resistant protective coating compositions and more particularly to priming compositions which when used with commercial finishing materials give highly scratch-resistant coatings.

The primary function of the priming coat in the paint, varnish and lacquer industry is one of adhesion. Many finishing materials having useful surface characteristics such as gloss, build, toughness, and durability, show insufficient adhesion to the object to which they are applied to be commercially successful. It has been found in many instances that through the use of carefully formulated priming coats, this poor adhesion can be improved and the usefulness of the top coat greatly increased. There are many priming coats available to the art at the present time, each of which has been developed to answer a specific purpose, and in most cases the primer is most successful when used in combination with one type of top coating material. In general, priming coats are applied in very thin layers, unless the priming function and filling function are to be combined. This invention is concerned primarily with the priming or adhesive function.

It is an object of the invention, therefore, to provide a priming coat of improved adhesive characteristics. Another object is the production of a priming coat having superior penetrating power when applied over porous surfaces, such as wood. A further object is the production of priming compositions which can be sprayed, brushed, dipped or applied by any convenient means. A still further object is the provision of priming compositions over which most commercial finishing materials can be applied and a satisfactory adhesive bond obtained. A primary object is the provision of priming compositions highly resistant to scratching in themselves and which are capable of imparting to top coat finishing materials vastly superior scratch-resistance. A still further object is the provision of priming compositions which will increase the over-all durability of the complete coating system. Other objects will appear as the invention is described more completely hereinafter.

These objects are accomplished by combining a polyvinyl butyraldehyde resin and a cellulose derivative compatible therewith in a liquid volatile solvent vehicle and applying the composition to a surface, preferably a wood surface, whereby a priming coat is obtained which is tightly adherent and highly scratch-resistant in itself and which also imparts to the top finish coat or coats superior scratch-resistance.

In the drawing the single figure is a triangular graph showing the properties of compositions containing shellac, cellulose nitrate and polyvinyl butyral resin. The point on the graph represented by the double circle shows the composition which is preferred.

I have found that resins formed by the treatment of polyvinyl acetate with a hydrolyzing agent (for example, sulfuric acid) followed by condensation with butyraldehyde to give a solid but soluble resinous body, are greatly superior to other resins in this same class, such as those resulting from formaldehyde, acetaldehyde, propionaldehyde, etc. In the following discussion I, therefore, prefer in all instances to use the polyvinyl butyraldehyde resins, although I have found instances in which some improvement in scratch-resistance is obtained when using other resins in this class. Polymerized polyvinyl acetate resins appear to be of little practical value in this connection. In the present invention I prefer to employ polyvinyl butyral resins of low viscosity, and those which are completely soluble in solvent combinations high in ester content.

The group of synthetic and natural resins mutually compatible with the polyvinyl butyral resin and the nitrocellulose is very small. Shellac, which is alcohol soluble and the sulfonamide resins, as for instance the resin formed by condensation reaction of p-toluene sulfonamide with formaldehyde, have been found to be the most satisfactory.

The following examples are given by way of illustration and no limitations are intended thereby, since modifications will readily occur to those in the art without departing from the spirit and scope of the invention.

EXAMPLE 1

| | Per cent by weight |
|---|---|
| Polyvinyl butyral resin* | 4.5 |
| Nitrocellulose** | 1.5 |
| Shellac (wax-free) | 1.5 |
| Denatured ethyl alcohol | 27.0 |
| n-butyl alcohol | 7.5 |
| Toluol | 10.7 |
| n-butyl acetate | 38.7 |
| Amyl acetate | 7.5 |
| Ethyl acetate | 1.1 |
| | 100.0 |

*The polyvinyl butyral resin was also characterized by a viscosity in the following formula:

| | Per cent by weight |
|---|---|
| Polyvinyl butyral resin | 20 |
| Denatured ethyl alcohol | 52 |
| Toluol | 28 |
| | 100 | of approximately 3,000 centipoises. To obtain practical spraying limits, it has been found that resins in the viscosity range of 2,300 to 4,500 centipoises can be used without substantially altering the spraying characteristics of the formula. It is desirable in many cases to produce a sprayable composition, that is, one substantially free from veiling, at a higher solids concentration. An instance of this was the production of a composition having 15% total solids as compared with the 7.5% total solids of the example. A polyvinyl butyral resin having a viscosity characteristic of 275 centipoises was used in this instance. The composition employing this relatively low viscosity resin was comparable in scratch-resistance to the composition of Example 1, thus illustrating the wide range of viscosities that characterize suitable resins. Polyvinyl butylral resins having viscosities above 4,500 centipoises are not desirable because of the low solids produced in the final spray mixture, and the thin coats produced on spraying.

** The nitrocellulose used in this example was of the low viscosity type and when dissolved in formula A of the A. S. T. M. specification D-301-33 had a viscosity of approximately 40 centipoises at 25° C.

It is desirable from a commercial and economic point of view to have the solids concentration of these priming compositions substantially equal to that of a commercial top coat lacquer, inasmuch as it is proposed to substitute one coat of the priming lacquer for one coat of the present two or three-coat standard finishing system. My invention resides in the discovery of the unexpected improvement in scratch-resistance obtained through the use of the compositions disclosed, when using polyvinyl butyral resins over a wide range of viscosity.

I prefer, also, to use nitrocellulose of the very low viscosity type as a means of securing the maximum possible solids concentrations, limited only by the well-recognized fact that viscosity reduction can be carried out drastically enough to substantially degrade the film-forming characteristics of the nitrocellulose, which conditions will give priming compositions of inferior characteristics. The nitrogen content of the nitrocellulose may vary between 10.6 and 12.5%, that is, the commercial range of solution nitrocellulose.

The shellac used was a standard commercial wax-free, bleached grade and was first dissolved in an equal volume of denatured ethyl alcohol and allowed to settle until clear.

The final composition was prepared by combining all ingredients, including the shellac solution, in a simple mixer equipped with a high speed agitator. Filtration of the final product was carried out in order to make sure that all dirt, lumps and foreign material were removed.

The finished mixture had a viscosity of approximately 30 centipoises at 25° C. and was ready for spray application. It was found that it could be satisfactorily sprayed with standard equipment and panels of several varieties of close grained wood were coated with thin coats. The drying time of the primer was found to be very short and directly comparable in this respect with conventional nitrocellulose type wood primers. The coated panels were given a light scuffing or dry sanding with sandpaper and a top coat of the following typical furniture lacquer applied:

Clear nitrocellulose furniture lacquer

| | Per cent |
|---|---|
| Nitrocellulose (low viscosity) | 10.4 |
| Blown castor oil | 8.2 |
| Damar resin | 7.6 |
| 23A denatured ethyl alcohol | 15.3 |
| n-Butyl alcohol | 25.0 |
| Ethyl acetate | 7.3 |
| n-Butyl alcohol | 4.2 |
| Toluol | 15.7 |
| High solvency petroleum naphtha (95-135° C.) | 16.7 |
| | 100.0 |

The finished panels were then compared with panels prepared in orthodox fashion. In one instance, panels primed with a high alkyd resin content nitrocellulose sealer were coated with the same top coat lacquer. In the second instance, panels were coated with the regular furniture lacquer without primer or sealer. All panels were handled and aged in the same manner.

Accelerated durability tests indicated that the panels which had been primed with the polyvinyl butyral type composition gave markedly greater durability and resistance to checking and cracking upon exposure to repeated wet and dry conditions. The most remarkable difference, however, was found to be in scratch resistance. A coin pulled broadside with considerable downward pressure along the surface of the lacquered panel, in the case of the improved primer, showed little or no signs of scratching. When observed under the microscope at a magnification of approximately 50 diameters the top coat film of lacquer appeared to be very tough and closely adherent to the wood surface. In the case of the panels having the nitrocellulose-alkyd resin sealer under the normal lacquer, the lacquer top coat appeared to be very brittle and chipped off in small flakes. Also, the separation of the coating from the wood could be noted to spread well ahead of the coin as it was pulled along. In the case of the wood panel coated with the lacquer alone, the effect was intermediate between the sealed panel and the primed panel. The lacquer when used alone appeared to have greater toughness than when used over a brittle sealer, but this toughness could not be compared with the toughness secured when the lacquer top coat was applied over the special primer. We have found, therefore, that a very thin coat of the primer completely changes the physical characteristics of the top coat, by increasing its toughness and resistance to scratching without altering the gloss or appearance of the surface coat. The adhesion of the top coat to the wood panel has also been greatly increased.

Another experiment was carried out with this priming composition in which it was applied to a steel panel in place of the usual pigmented primers based on natural drying oils and resins. A typical nitrocellulose enamel was applied over the primer coat and the characteristics of the finished system observed in comparison with an orthodox system. As in the case of the wood panels, the use of the improved primer greatly increased the scratch-resistance. The new priming composition is also of merit in the anameling of finger nails where it functions to considerable advantage in improving the adhesion of the cellulose nitrate compositions employed as the top coat.

The ratios between the polyvinyl butyral resins, nitrocellulose and shellac in Example 1 represents the optimum found in my experiments. This ratio of 30:10:10 is not, however, absolutely necessary as I have found that I can change these ratios over a fairly wide range and still obtain appreciable benefit in scratch-resistance. I am limited, however, by certain definite characteristics including (1) the fact that the polyvinyl butyral resin alone does not spray satisfactorily due to a bad veiling effect which prevents the application of smooth, uniform coatings. (2) Also, the polyvinyl butyral resin alone does not show satisfactory adhesion when applied by spraying, tending to strip in sheet form from the wood or metal. (3) Higher ratios of nitrocellulose are possible within a moderate range provided that the viscosity characteristic of the nitrocellulose is not lowered to the point that it loses the basic film properties of the grade used in this example. The use of higher viscosity nitrocellulose or larger ratios of the same grade of nitrocellulose, as used above, would tend to lower the solids concentration at spraying viscosity. (4) I prefer to make use of shellac in the ratio specified although it may in certain compositions be completely eliminated. Of the three components of my preferred composition, the shellac represents the least important. It has, however, the very desirable quality of improving the build and gloss characteristics, and in addition, in the finishing of wood can be recoated without it being caused to sink into the pores of the wood. Its use in the wood industry has had wide-spread commercial importance because of this excellent recoating tendency. It is, therefore, the preferred resin for use in my invention although other compatible resins, such as the polymerized toluene-sulfonamide resins, can be used with success.

The accompanying trianguler coordinate chart shows the range in which greatly superior scratch-resistance and durability has been obtained and satisfactory coating properties observed. General defects of the remaining compositional areas are also shown.

In general, for best practical results, when no shellac is present in the compositions, the proportion by weight of polyvinyl butyraldehyde resin to cellulose nitrate lies between about 65 to 25 parts of polyvinyl butyraldehyde resin to about 35 to 75 parts of cellulose nitrate. When shellac is employed as a modifying ingredient, this resin should not exceed a proportion of about 25 parts by weight of polyvinyl butyraldehyde resin to 33 parts of cellulose nitrate to 42 parts of shellac. The preferred composition comprises the polyvinyl butyraldehyde resin, cellulose nitrate and shellac in the proportion by weight of about 60 parts of polyvinyl butyraldehyde resin, 20 parts of cellulose nitrate and 20 parts of shellac.

In the place of nitrocellulose, I have found it possible to use ethyl cellulose provided that the formula is slightly rebalanced to compensate between the known difference in properties of nittrocellulose and ethyl cellulose. Cellulose acetate has been found to be substantially incompatible and, therefore, of little use. Due to the inherent toughness of the polyvinyl acetals, particularly the butyraldehyde derivative, it is unnecessary to use plasticizers in most instances; experimental studies having shown that the presence of plasticizer is normally accompanied by a marked reduction in sanding characteristics. However, very small amounts may be used and definite scratch-resistance noted in the finished compositions. While I have described my invention as being preferred when a top coat of a nitrocellulose lacquer is used, many practical experiments have been carried out with other top coats such as varnishes, paints and synthetic resin finishes based upon the alkyd resins, the urea formaldehyde resins, and the phenol formaldehyde resins. Improved coating systems based upon the described primer and top coats of straight polyvinyl resins including the polyvinyl acetals and the polyvinyl chloracetates have also been developed and are to be understood as covered by my disclosure.

The most important and peculiar advantage which characterizes the new compositions resides in the superior scratch-resistance and their ability to impart this most desirable property to various types of coating compositions applied thereover. Of commercial interest also is the remarkable adhesion afforded by the new products which when employed with conventional top coat compositions provide a finish of outstanding adherence to the base surface. The compositions have unique penetrating power when applied to porous surfaces, such as wood, and this property contributes materially to the superlative adhesion and scratch-resistance of the ultimate finish when the primer is employed with this type of base. The compositions of the invention also form the basically important element in developing the excellent general durability of the ultimate finish.

It is apparent that many widely different embodiments of the invention may be made without departing from the spirit and scope thereof; and, therefore, it is not intended to be limited except as indicated in the appended claims.

I claim:

1. A highly adhesive and scratch-resistant priming composition comprising polyvinyl butyraldehyde resin, cellulose nitrate and shellac in the proportion by weight of up to about 42 parts of shellac and of at least 58 parts of polyvinyl butyraldehyde resin and cellulose nitrate in the proportion by weight of between about 65 parts of polyvinyl butyral resin to 35 parts of cellulose nitrate and 25 parts of polyvinyl butyral resin to 75 parts of cellulose nitrate.

2. A highly adhesive and scratch-resistant priming composition comprising polyvinyl butyraldehyde resin, cellulose nitrate and shellac in the proportion by weight of about 60 parts of polyvinyl butyraldehyde resin, 20 parts of cellulose nitrate and 20 parts of shellac.

3. A wood article of manufacture carrying a highly scratch-resistant priming composition comprising polyvinyl butyraldehyde resin, cellulose nitrate and shellac in the proportion by weight of up to about 42 parts of shellac and of at least 58 parts of polyvinyl butyraldehyde resin and cellulose nitrate in the proportion by weight of between about 65 parts of polyvinyl butyral resin to 35 parts of cellulose nitrate and 25 parts of polyvinyl butyral resin to 75 parts of cellulose nitrate.

RAY L. OVERHOLT.